(12) United States Patent
Duguay et al.

(10) Patent No.: US 9,822,668 B2
(45) Date of Patent: Nov. 21, 2017

(54) BLADE OUTER AIR SEAL SPRING CLIPS

(71) Applicant: UNITED TECHNOLOGIES CORPORATION, Farmington, CT (US)

(72) Inventors: Brian Duguay, Berwick, ME (US); Neil L. Tatman, Brentwood, NH (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 326 days.

(21) Appl. No.: 14/696,862

(22) Filed: Apr. 27, 2015

(65) Prior Publication Data

US 2016/0312661 A1    Oct. 27, 2016

(51) Int. Cl.
*F01D 11/08* (2006.01)
*F01D 25/28* (2006.01)
*F16B 2/22* (2006.01)
*F01D 25/24* (2006.01)

(52) U.S. Cl.
CPC .............. *F01D 25/28* (2013.01); *F01D 11/08* (2013.01); *F01D 25/246* (2013.01); *F16B 2/22* (2013.01); *F05D 2220/36* (2013.01); *F05D 2240/55* (2013.01); *F05D 2260/30* (2013.01)

(58) Field of Classification Search
CPC .. F16B 2/245; F16B 2/241; F16B 2/24; F16B 2/246; F16B 2/22; F16B 5/125; Y10T 403/60; F01D 25/28; F01D 11/08; F01D 11/025; F01D 25/246; F01D 2220/36; F01D 11/005; F05D 2220/36; F05D 2240/55; F05D 2260/30
USPC ................................ 24/570, 547, 546, 457
See application file for complete search history.

(56) References Cited

U.S. PATENT DOCUMENTS

| | | | | |
|---|---|---|---|---|
| 3,325,128 A | * | 6/1967 | Elleboudt | F16B 2/22 174/70 C |
| 4,315,611 A | * | 2/1982 | Hoop | E04B 9/006 248/228.7 |
| 2012/0204386 A1 | * | 8/2012 | Kipker | F16B 2/245 24/457 |

FOREIGN PATENT DOCUMENTS

| EP | 1707751 A2 | 4/2006 |
|---|---|---|
| WO | 2013163581 A1 | 10/2013 |

OTHER PUBLICATIONS

European Search Report and Communication; EP 16 15 7938; Dated Sep. 16, 2016; 8 pages.

* cited by examiner

*Primary Examiner* — Jack W Lavinder
(74) *Attorney, Agent, or Firm* — Cantor Colburn LLP

(57) ABSTRACT

A spring clip for a blade outer air seal (BOAS) includes a clip body defining a first end configured to operatively engage with a BOAS retaining structure on a BOAS and a second end configured to engage with at least one of a mounting hook of a BOAS and a BOAS mount.

13 Claims, 3 Drawing Sheets

BLADE OUTER AIR SEAL SPRING CLIPS

STATEMENT OF GOVERNMENT RIGHTS

This invention was made with government support under contract no. FA8650-09-D-2923 0021 awarded by the Air Force. The government has certain rights in the invention.

BACKGROUND

1. Field

The present disclosure relates to blade outer air seals (BOAS), more specifically to mounting assemblies and devices for BOAS.

2. Description of Related Art

Certain traditional BOAS mounts include a full hoop structure which allowed the BOAS to be interference fit between the BOAS mount and a vane support to secure the BOAS and allow a positive contact between the BOAS and an aft seal. However, certain BOAS mounts are segmented (i.e., not full hoop in structure), which prevents an interference fit from properly sealing the aft face of the BOAS due to rotation of the BOAS mount from torque exerted on the BOAS mount by the BOAS contact with the aft seal. Traditional mounting systems resist this torque using the full hoop structure of the BOAS mount.

Such conventional methods and systems have generally been considered satisfactory for their intended purpose. However, there is still a need in the art for improved BOAS mounting assemblies and devices. The present disclosure provides a solution for this need.

SUMMARY

A spring clip for a blade outer air seal (BOAS) includes a clip body defining a first end configured to operatively engage with a BOAS retaining structure on a BOAS and a second end configured to engage with at least one of a mounting hook of a BOAS and a BOAS mount. The clip body can include a substantially uniform thickness.

The first end can include a first end bend to be retained by the BOAS retaining structure. The second end can include a second end bend to wrap around the BOAS mounting hook. The second end can be narrower than the first end in a circumferential direction.

The clip body can include a straight portion and a radially curved portion to allow the first end to communicate with the BOAS retaining structure and the straight portion of the clip body to sit flush on the BOAS mounting hook proximate the second end.

The spring clip can further include an axial retaining feature extending from the clip body to communicate with a retention tab of the BOAS mount. The axial retaining feature can be formed from the center of the clip body such that the retaining feature forms a living hinge with the clip body.

In certain embodiments, the axial retaining feature does not have equivalent curvature with the clip body. The axial retaining feature can extend straight from the clip body. The axial retaining feature can extend parallel to the straight portion. The axial retaining feature can include a bent end portion, wherein the bend end portion bends away from the clip body.

In certain embodiments, the spring clip can include any suitable combination of features as described above.

A system can include a blade outer air seal (BOAS) mount having hook receiving members and a BOAS including a plurality of mounting hooks. The plurality of mounting hooks can include at least one forward hook and at least two aft hooks and the BOAS can include a BOAS retaining structure, and a spring clip as described above.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
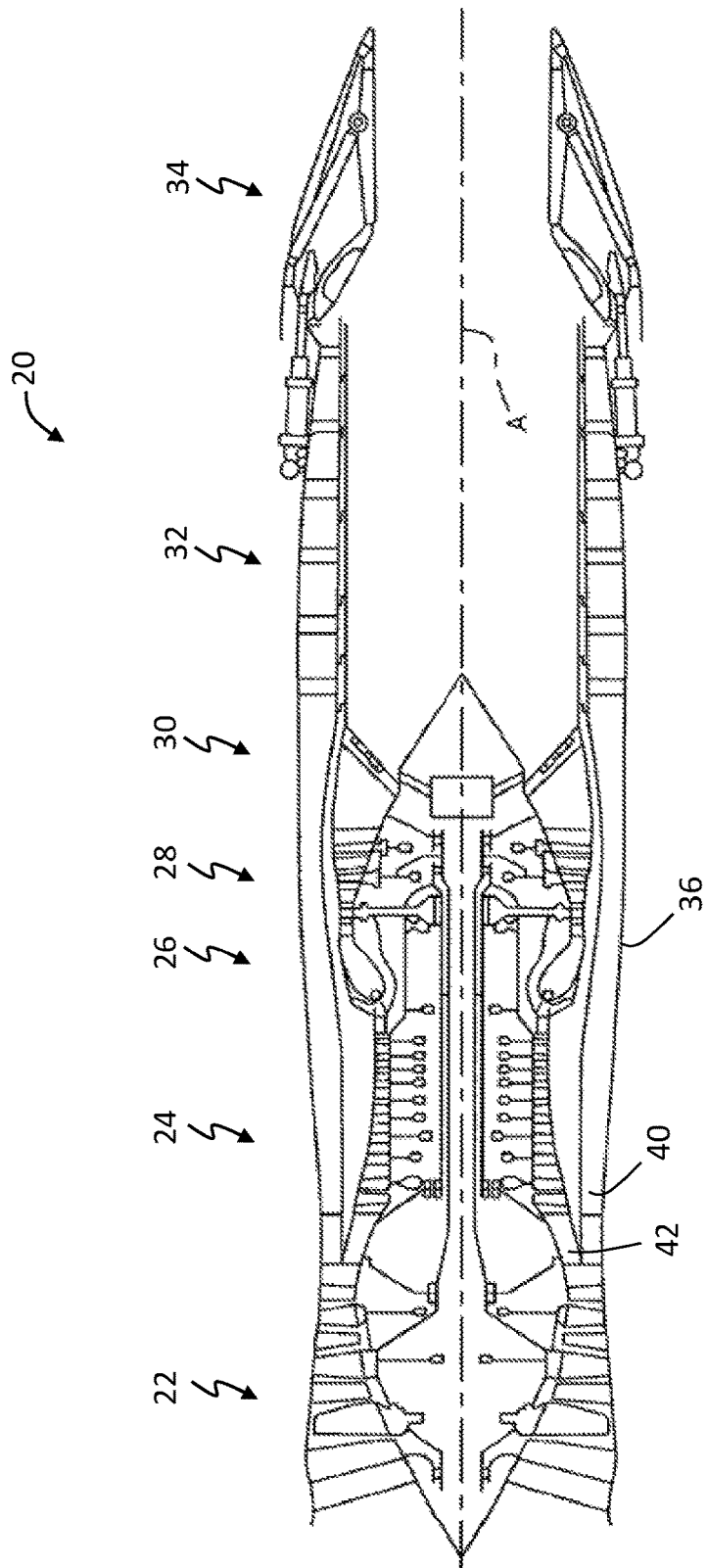
FIG. 1 is a schematic view of a turbomachine in accordance with this disclosure.

Reference will now be made to the drawings wherein like reference numerals identify similar structural features or aspects of the subject disclosure. For purposes of explanation and illustration, and not limitation, an illustrative view of an embodiment of a spring clip in accordance with the disclosure is shown in FIG. 2 and is designated generally by reference character 200. Other embodiments and/or aspects of this disclosure are shown in FIGS. 1 and 3-5. The systems and methods described herein can be used to suitably mount blade outer air seals in segmented mounting systems.

Figure 2:
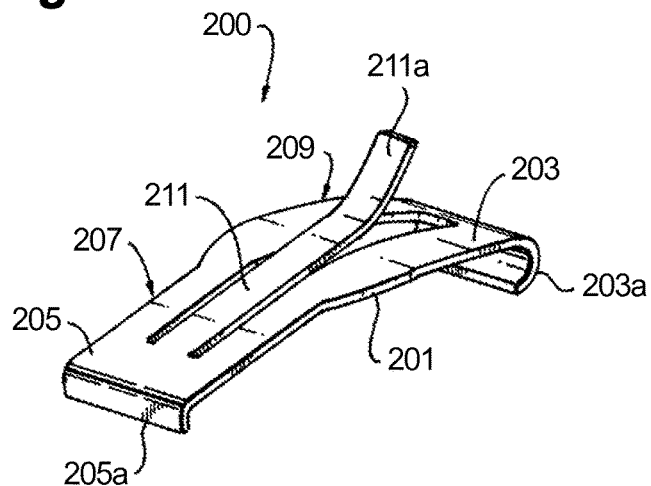
FIG. 2 is a perspective view of an embodiment of a spring clip in accordance with this disclosure.

FIG. 1 schematically illustrates a gas turbine engine 20. The gas turbine engine 20 is disclosed herein as a two-spool low-bypass augmented turbofan that generally incorporates a fan section 22, a compressor section 24, a combustor section 26, a turbine section 28, an augmenter section 30, an exhaust duct section 32, and a nozzle system 34 along a central longitudinal engine axis A. Although depicted as an augmented low bypass turbofan in the disclosed non-limiting embodiment, it should be understood that the concepts described herein are applicable to other gas turbine engines including non-augmented engines, geared architecture engines, direct drive turbofans, turbojet, turboshaft, multi-stream variable cycle adaptive engines and other engine architectures. Variable cycle gas turbine engines power aircraft over a range of operating conditions and essentially alters a bypass ratio during flight to achieve countervailing objectives such as high specific thrust for high-energy maneuvers yet optimizes fuel efficiency for cruise and loiter operational modes.

An engine case structure 36 defines a generally annular secondary airflow path 40 around a core airflow path 42. It should be appreciated that various components, individually and collectively, may define the engine case structure 36 that essentially defines an exoskeleton to support the rotational hardware.

Air that enters the fan section 22 is divided between a core airflow through the core airflow path 42 and a secondary airflow through a secondary airflow path 40. The core airflow passes through the combustor section 26, the turbine section 28, then the augmentor section 30 where fuel may be selectively injected and burned to generate additional thrust through the nozzle system 34. It should be appreciated that additional airflow streams such as third stream airflow typical of variable cycle engine architectures may additionally be sourced from the fan section 22.

The secondary airflow may be utilized for a multiple of purposes to include, for example, cooling and pressurization. The secondary airflow as defined herein may be any airflow different from the core airflow. The secondary airflow may ultimately be at least partially injected into the core airflow path 42 adjacent to the exhaust duct section 32 and the nozzle system 34.

The exhaust duct section 32 may be circular in cross-section as typical of an axisymmetric augmented low bypass turbofan or may be non-axisymmetric in cross-section to include, but not be limited to, a serpentine shape to block direct view to the turbine section 28. In addition to the various cross-sections and the various longitudinal shapes, the exhaust duct section 32 may terminate in a Convergent/Divergent (C/D) nozzle system, a non-axisymmetric two-dimensional (2D) C/D vectorable nozzle system, a flattened slot nozzle of high aspect ratio or other nozzle arrangement.

Figure 3:
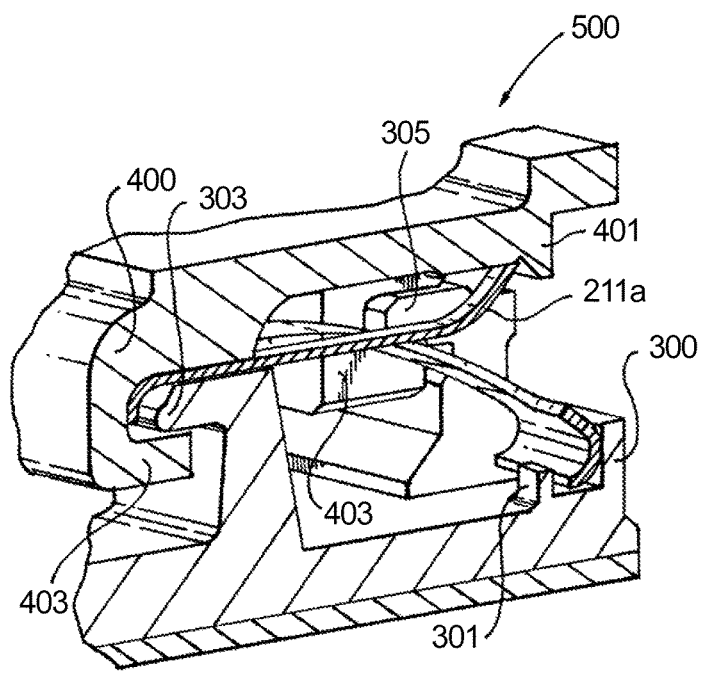
FIG. 3 is perspective cross-sectional view of an embodiment of a system in accordance with this disclosure, shown including the spring clip of FIG. 2.
Figure 4:
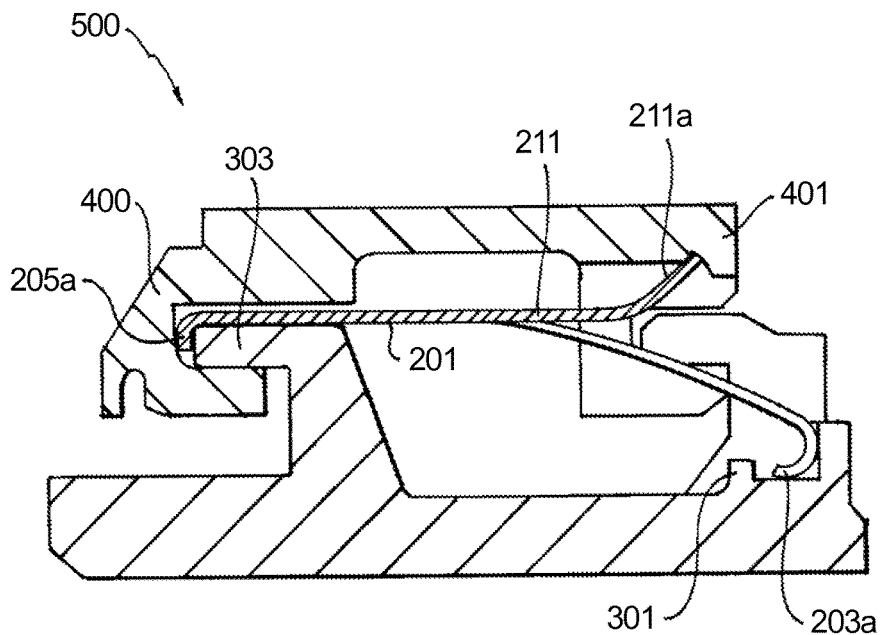
FIG. 4 is cross-sectional view of the system of FIG. 3.
Figure 5:
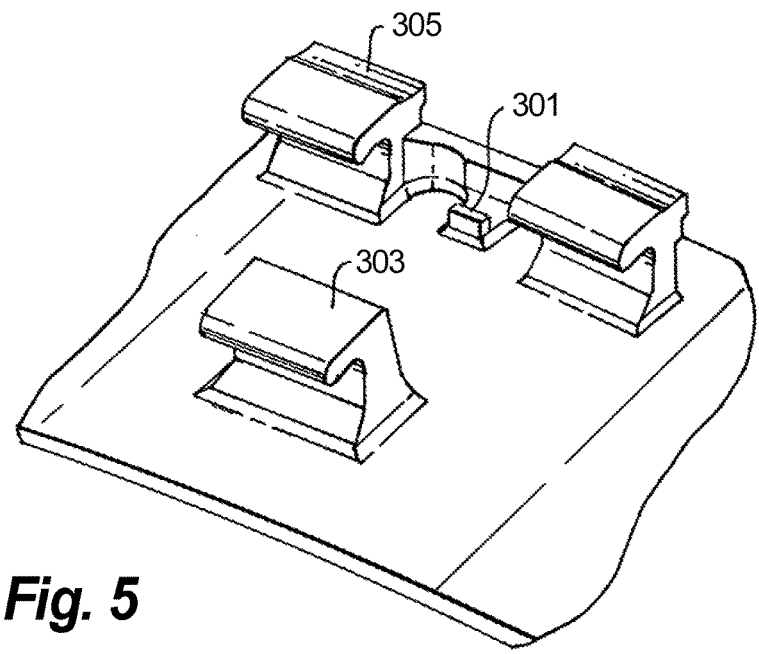
FIG. 5 is a perspective top view of a BOAS of the system as shown in FIG. 3.

Referring to FIGS. 2-4, a spring clip 200 for a blade outer air seal (BOAS) 300 includes a clip body 201 defining a first end 203 configured to operatively engage with a BOAS retaining structure 301 on a BOAS 300 (e.g., as shown in FIG. 5). The spring clip 200 includes a second end 205 configured to engage with at least one of a mounting hook 303 of a BOAS 300 and a BOAS mount 400. As shown, the clip body 201 can include a substantially uniform thickness or any other suitable variable thickness.

As shown, the first end 203 can include a first end bend 203a that can contact one or more surfaces of the BOAS retaining structure 301 to push or pull on the BOAS 300. While the first end bend 203a is shown as having about a 180 degree bend, any suitable bend degree is contemplated herein. The first end bend allows 203a can be configured to allow the spring clip 200 to axially retain the BOAS 300 at times when the BOAS 300 is axially loose to prevent the BOAS 300 from sliding axially off of hook receiving members 403 (e.g., during installation into the turbomachine case). In a certain conditions, the spring clip 200 can be sized to provide a restoring force to push the BOAS 300 against an aft face seal (not shown) when installed in a turbomachine in order to maintain positive contact with the aft face seal.

The second end 205 can include a second end bend 205a configured to wrap around the BOAS mounting hook 401. While the second end bend 205a is shown as having about a 90 degree bend, any suitable bend degree is contemplated herein. In certain embodiments, the second end 205 can be narrower than the first end 203 in a circumferential direction of the turbomachine.

The clip body 201 can include a straight portion 207 and a radially curved portion 209 to allow the first end 203 to communicate with the BOAS retaining structure 301. The straight portion 205 of the clip body 201 is capable of sitting flush on the BOAS mounting hook 303 proximate the second end 205.

The spring clip 200 can further include an axial retaining feature 211 extending from the clip body 201 and configured to communicate with a retention tab 401 of the BOAS mount 400. The axial retaining feature 211 can be formed from the center of the clip body 201 such that the retaining feature 211 forms a living hinge with the clip body 201. It is contemplated that the axial retaining feature 211 can be attached to the spring clip 200 separately.

In certain embodiments, the axial retaining feature 211 does not have equivalent curvature with the clip body 201. For example, the axial retaining feature 211 can extend straight from the clip body 201 as shown. The axial retaining feature 211 can extend parallel to the straight portion 207 for at least a portion thereof.

As shown, the axial retaining feature 211 can include a bent end portion 211a. In certain embodiments, the bend end portion 211a can bend away from the clip body 201 (e.g., such that the axial retaining feature 211 has an opposite bend compared to curved portion 209). Any other suitable shape, size, or configuration of the axial retaining feature 211 is contemplated herein.

Referring to FIGS. 2 and 3, a system 500 can include a BOAS mount 400 including hook receiving members 403. The system 500 also includes a BOAS 300 including a plurality of hooks including at least one aft hook 303 and at least two forward hooks 305. The BOAS 300 can also include a BOAS retaining structure 301. The system 500 can include, and a spring clip 200 as described above.

It is contemplated that the spring clip 200 can be installed into BOAS 300 before insertion into the turbomachine. This assembly can then be inserted axially into the turbomachine. The spring clip 200 can then engage the BOAS mount 400 at retention tab 401 via axial retaining feature 211. The first end bend 203a can prevent the BOAS 300 from sliding off of the hook receiving members 403 by contacting the retaining structure 301 in the event the BOAS 300 slides away from the hook receiving members 403.

Other components of the turbomachine can then be assembled. In certain turbomachines without a spring clip 200 as disclosed hereinabove, a face seal (not shown) can be aft of the BOAS 300 and may not be in positive contact with the BOAS 300 (e.g., if the BOAS 300 is in a forward position), thereby causing a gap therebetween and an unsealed path for hot gas path flow to escape. However, using the spring clip 200 as disclosed hereinabove, the BOAS 300 can be pushed forward by the first end 203 of the spring clip 200 to maintain a positive contact with the aft face seal in all operational conditions, preventing gas path leak.

The methods and systems of the present disclosure, as described above and shown in the drawings, provide for BOAS systems with superior properties including spring clips for mounting BOAS to BOAS mounts. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A system, comprising:
   a blade outer air seal (BOAS) mount including hook receiving members;
   a BOAS including a plurality of mounting hooks, the plurality of mounting hooks including at least one aft hook and at least two forward hooks, the BOAS including a BOAS retaining structure; and
   a spring clip including a clip body defining a first end operatively engaged with the BOAS retaining structure on the BOAS and a second end engaged with at least one of the aft hook of the BOAS and one of the hook receiving members.

2. The system of claim 1, wherein the clip body includes a substantially uniform thickness.

3. The system of claim 1, wherein the first end includes a first end bend to be retained by the BOAS retaining structure.

4. The system of claim 1, wherein the second end includes a second end bend to wrap around the BOAS mounting hook.

5. The system of claim 1, wherein the second end is less wide than the first end.

6. The system of claim 1, wherein the second end is narrower than the first end in a circumferential direction.

7. The system of claim 1, wherein the clip body includes a straight portion and a radially curved portion to allow the first end to communicate with the BOAS retaining structure and the straight portion of the clip body to sit flush on the BOAS mounting hook proximate the second end.

8. The system of claim 7, further including an axial retaining feature extending from the clip body to communicate with a retention tab of the BOAS mount.

9. The system of claim 8, wherein the axial retaining feature is formed from the center of the clip body such that the retaining feature forms a living hinge with the clip body.

10. The system of claim 8, wherein the axial retaining feature does not have equivalent curvature with the clip body.

11. The system of claim 8, wherein the axial retaining feature extends straight from the clip body.

12. The system of claim 8, wherein the axial retaining feature extends parallel to the straight portion.

13. The system of claim 8, wherein the axial retaining feature includes a bent end portion, wherein the bent end portion bends away from the clip body.

* * * * *